US007231447B2

(12) United States Patent
Kuroda

(10) Patent No.: US 7,231,447 B2
(45) Date of Patent: Jun. 12, 2007

(54) NETWORK GAME SYSTEM AND METHOD FOR PROVIDING CONTINUED NETWORK GAMES

(75) Inventor: Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 837 days.

(21) Appl. No.: 10/015,684

(22) Filed: Dec. 17, 2001

(65) Prior Publication Data
US 2002/0082087 A1    Jun. 27, 2002

(30) Foreign Application Priority Data
Dec. 27, 2000    (JP)    ............ P.2000-399432

(51) Int. Cl.
    *A63F 13/10*    (2006.01)
    *G06F 19/00*    (2006.01)
(52) U.S. Cl. .................. 709/226; 709/219; 463/42; 463/43
(58) Field of Classification Search ................ 709/226; 463/42, 43
    See application file for complete search history.

(56) References Cited

U.S. PATENT DOCUMENTS

| 5,654,746 | A |   | 8/1997  | McMullan, Jr. et al. |        |
|-----------|---|---|---------|----------------------|--------|
| 5,890,963 | A | * | 4/1999  | Yen ................. | 463/42 |
| 5,905,862 | A | * | 5/1999  | Hoekstra ........... | 709/202|
| 6,267,672 | B1| * | 7/2001  | Vance ............... | 463/29 |
| 6,615,248 | B1| * | 9/2003  | Smith ............... | 709/217|
| 6,669,564 | B1| * | 12/2003 | Young et al. ....... | 463/42 |
| 6,690,992 | B1| * | 2/2004  | Pytlovany .......... | 707/102|
| 6,746,333 | B1| * | 6/2004  | Onda et al. ........ | 463/43 |
| 6,758,757 | B2| * | 7/2004  | Luciano et al. .... | 463/43 |

FOREIGN PATENT DOCUMENTS

WO    WO 00/55740 A1    9/2000

OTHER PUBLICATIONS

Diot, C. et al.,"A distributed architecture for multiplayer interactive applications on the Internet", IEEE Network, v 13, i 4, p. 6-15, Aug. 1999.*

\* cited by examiner

*Primary Examiner*—Patrice L. Winder
(74) *Attorney, Agent, or Firm*—Sughrue Mion, PLLC

(57) ABSTRACT

A network game system for operating on a network a game made up of basic content containing a basic program for executing start of a game solely and one or more types of relevant content each containing a relevant program corresponding to the basic program for further advancing the game started by the basic program. The system includes a content management section adapted to set an address of which users are not notified in one or more content providing servers each in which the relevant program is placed, the address for which a search is made by search means on the network from a user terminal; wherein the content providing server sends the relevant content placed in the content providing server to the user terminal in response to a download request made by the accessing user.

15 Claims, 7 Drawing Sheets

FIG. 3

| PROVIDED CONTENT NAME | | | | RELEVANT CONTENT A | | | |
|---|---|---|---|---|---|---|---|
| OPEN SCHEDULE ORDER | HP ADDRESS | PROVIDING SERVER NAME | REGISTRATION DATE | OPEN DATE | DOWNLOAD START DATE | DOWNLOAD END DATE | CLOSED DATE |
| 1 | http://..... | CONTENT PROVIDING SERVER 1 | 00.8.8 | 00.8.12 | 00.8.12 | 00.8.29 | 00.9.29 |
| 2 | | | 00.8.10 | 00.8.29 | 00.8.29 | 00.9.15 | |
| 3 | | | 00.9.2 | 00.9.1 | 00.9.15 | 00.10.10 | |
| ...... | ...... | ...... | ...... | ...... | ...... | ...... | ...... |

ENTER FIVE LETTERS IN THE
FOLLOWING BLANK FOR ENTERING
YOURSELF FOR THE PRIZE CONTEST:

COME ON THE MARKET FROM ABC BEER
THE AGE IS XXXXX BEER

FOR HINT, SEE HOME PAGE · · · ·

COME ON THE MARKET FROM ABC BEER
THE AGE IS SUPER BEER

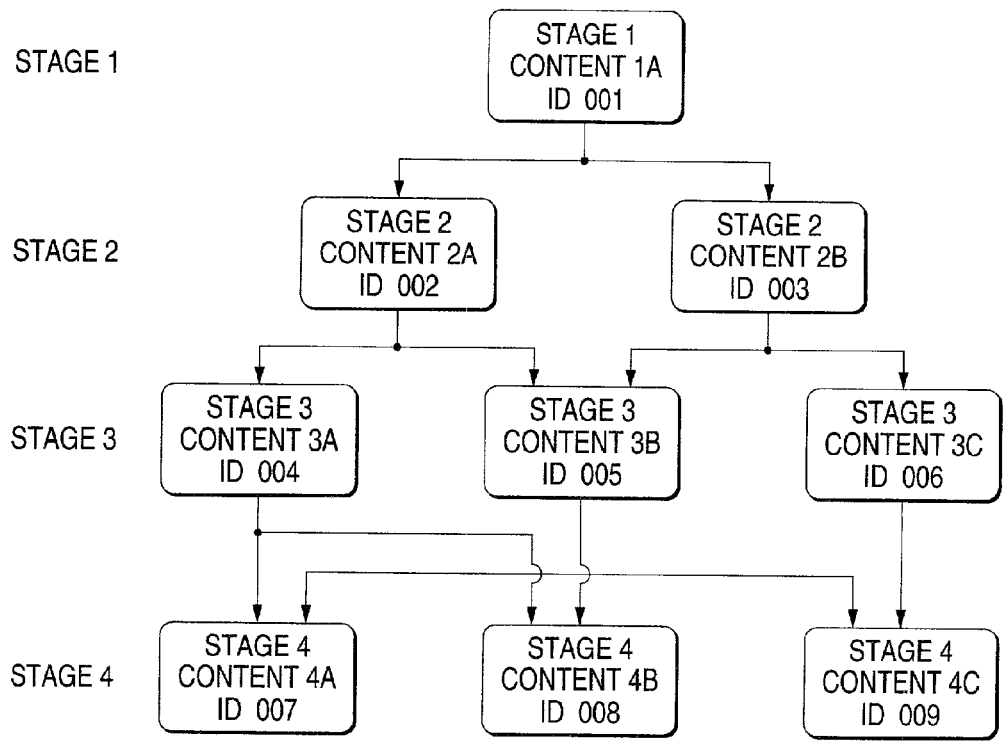

NETWORK GAME SYSTEM AND METHOD FOR PROVIDING CONTINUED NETWORK GAMES

BACKGROUND OF THE INVENTION

1. Field of the Invention

This invention relates to a network game system for providing content through a network and in particular to a technical field of a network game system for providing a program corresponding to basic content of a network game consisting of the basic content and relevant content and later providing the relevant content through a network.

2. Description of the Related Art

Hitherto, it has been common practice to provide game content using a record medium such as a CD-ROM as a game operating in a personal computer. In this case, the user previously gets the CD-ROM, etc., sets the CD-ROM, etc., in the personal computer, and operates a recorded program, so that the user can play any desired game.

On the other hand, an environment in which a game is operated without using any record medium such as a CD-ROM is implemented with the recent rapid wide spread use of the Internet. That is, in addition to distributing of game content to the user via the Internet, a network game for enabling an indefinite number of users to access a specific address and get involved in the game is becoming widespread.

To operate a game using a record medium such as a CD-ROM in the general way as described above, the game content is fixedly determined depending on the program and thus it is difficult to realize a game rich in variety.

On the other hand, to use the Internet as described above, it is difficult to reflect the action and the situation of each user on the game content for realizing a game rich in variety although the game content is independent of the program recorded on the record medium. If the specific address on the Internet is known by a malicious person, it is feared that he or she may make unauthorized access to the specific address.

SUMMARY OF THE INVENTION

It is therefore an object of the invention to provide a diverse and flexible network game system, etc., on which the action and the situation of each user are reflected in a simple and safety network environment to provide content of a game, etc., for the user.

To accomplish the object, according to a first aspect of the invention, there is provided a network game system for operating on a network a game made up of basic content containing a basic program for executing start of a game solely and one or more types of relevant content each containing a relevant program corresponding to the basic program for further advancing the game started by the basic program, characterized by content management means for setting an address of which the users are not notified in one or more content providing servers each in which the relevant program is placed, the address for which a search is made by search means on the network from a user terminal, and characterized in that the content providing server sends the relevant content placed in the content providing server to the user terminal in response to a download request made by the accessing user.

According to a second aspect of the invention, there is provided a network game providing method for providing for the users over a network a game made up of basic content provided for each user and containing a basic program for executing start of a game solely and one or more types of relevant content each containing a relevant program corresponding to the basic program for further advancing the game started by the basic program, said network game providing method comprising the steps of setting an address of which the users are not notified in one or more content providing servers each in which the relevant program is placed, the address for which a search is made by search means on the network from a user terminal, and when the user accessing the content providing server makes a download request, sending the relevant content placed in the content providing server to the user terminal.

According to the first and second aspects of the invention, when the user get involved in a network game executes the basic program contained in the basic content with the user terminal for starting the game, a situation in which the user acquires relevant content of an item, a keyword, etc., occurs to advance the game. At this time, if the user makes a search using a general-purpose search engine, etc., via the network and accesses the content providing server based on the search result arid makes a request to download the relevant content containing the relevant program corresponding to the basic program, the relevant content is sent to the user terminal. Thus, the user can voluntarily find out the relevant content not initially held and makes the relevant content collaborate with the basic content and it is make possible to provide a diverse and flexible network game system, etc., on which the taste of each user is reflected without being restricted by the original basic content.

In the first aspect of the invention, the relevant content may have a check program for previously checking the link possibility with the basic content or any other type of relevant content.

In the second aspect of the invention, the relevant content may have a check program for previously checking the link possibility with the basic content or any other type of relevant content.

In the above structure, when the user downloads the relevant content and links the relevant content with the basic content or any other type of relevant content, the check program operates and previously checks the link possibility. Thus, the applicability of the network game can be widened, for example, in such a manner that the invention is applied to a multistory game wherein various stories are combined as desired and are advanced.

In the first aspect of the invention, the content providing server checks the holding state of relevant content in the user terminal and checks the link possibility between the relevant content held in the user terminal and the relevant content requested to be downloaded.

In the second aspect of the invention, when the user accessing the content providing server makes the download request, the holding state of relevant content in the user terminal is checked and the link possibility between the relevant content held in the user terminal and the relevant content requested to be downloaded is checked.

In the above structure, when the user accesses the content providing server and makes a request to download the relevant content, the content providing server checks the link possibility between the relevant content and the relevant content already held in the user terminal. Thus, the applicability of the network game can be widened, for example, in such a manner that the invention is applied to a multistory game wherein various stories are combined as desired and are advanced.

In the first aspect of the invention, each of the content providing servers has one or more content providing home pages capable of providing one or more types of relevant content for the accessing user and the content management means sets the address of which the users are not notified in the one or more content providing home pages.

In the second aspect of the invention, each of the content providing servers has one or more content providing home pages capable of providing one or more types of relevant content for the accessing user and the address of which the users are not notified is set in the one or more content providing home pages.

In the first and second aspects of the invention, the content providing home page found out by the user using the search means may be a page in which the address of which the users are not notified is set and is a page opened by the content providing server for providing the relevant content. Thus, the user enjoys the process of voluntarily finding out the content providing home page and the world of the conventional network game can be more enlarged because of the added value of the content providing home page.

In the above structure, the content management means may change the address of the content providing home page with a lapse of time.

In the second aspect of the invention, the address of the content providing home page may change with a lapse of time.

In the first and second aspects of the invention, the address of the content providing home page accessed by the user is changed with a lapse of time, so that the content providing home page can be moved freely in response to the time and the situation for making it possible to provide content richer in change.

In the first aspect of the invention, the content providing server may determine unauthorized access to the content providing home page and if unauthorized access is made, changes the address of the content providing home page.

In the second aspect of the network game providing method, unauthorized access to the content providing home page may be determined and if unauthorized access is made, the address of the content providing home page may change.

In the first and second aspects of the invention, if unauthorized access is made to the content providing home page, it may be determined and then the address may be changed, so that assaulting the content providing home page by making unauthorized access can be prevented effectively.

In the second aspect of the network game system, the content providing server may limit the number of users for which the relevant content is to be provided from the content providing home page.

In the second aspect of the invention, the number of users for which the relevant content is to be provided from the content providing home page may be limited.

In the above structure, providing the relevant content is limited based on the number of users accessing the content providing home page. Thus, for example, the invention can be applied to items whose number is finite, etc., and it is made possible to provide content to more attract the user.

In the second aspect of the invention, the content management means may comprise user information registration means for registering user information and enables the relevant content to be provided only for the registered users.

According to the invention, the user information of the user who can use the network game system is registered and the content is provided only for the registered users, so that user management and charge processing in the network game system can be performed easily.

In the first aspect of the invention, in the network game system, to provide the relevant content for the user terminal, the content providing server performs mutual authentication processing with the user based on the user information and provides the relevant content for the user terminal after authenticating identification of the user.

According to the invention, to provide the content for the registered user, mutual authentication processing is performed and the content is provided after identification of the user is authenticated, so that providing the content for any other than the authorized users can be inhibited and the content providing system can be operated safely and reliably.

In the above structure, the content management means may have a management server for managing the download enable state of the relevant content from the content providing home page and when terminating downloading the relevant content from the content providing home page belonging to the content providing server, the content providing server notifies the management server of the fact.

According to the invention, when downloading the relevant content into the user accessing the content providing home page terminates, the content providing server notifies the management server of the fact and the management server manages the download enable state. Thus, the management server can easily keep track of the download state of the relevant content into the user and can manage the state in a unified manner.

BRIEF DESCRIPTION OF THE DRAWINGS

In the accompanying drawings:

FIG. 3 is a drawing to show an example of a content management table in a table management section of the management server;

FIG. 9 is a drawing to describe the story progress of a multistory game constructed in the network game system;

FIG. 10 is a drawing to show the data structure of content at each stage for checking the story link possibility after content contained in the multistory game is downloaded; and FIG. 11 is a drawing to show the data structure of content at each stage for checking the story link possibility before content contained in the multistory game is downloaded.

DETAILED DESCRIPTION OF THE PREFERRED EMBODIMENTS

Referring now to the accompanying drawings, there is shown a preferred embodiment of the invention. The embodiment will be discussed as the invention is applied to a content providing system for providing content that can be used by a large number of users. As an example of the content providing system, a network game system for providing a network game for the user through a network can be named.

Figure 1:
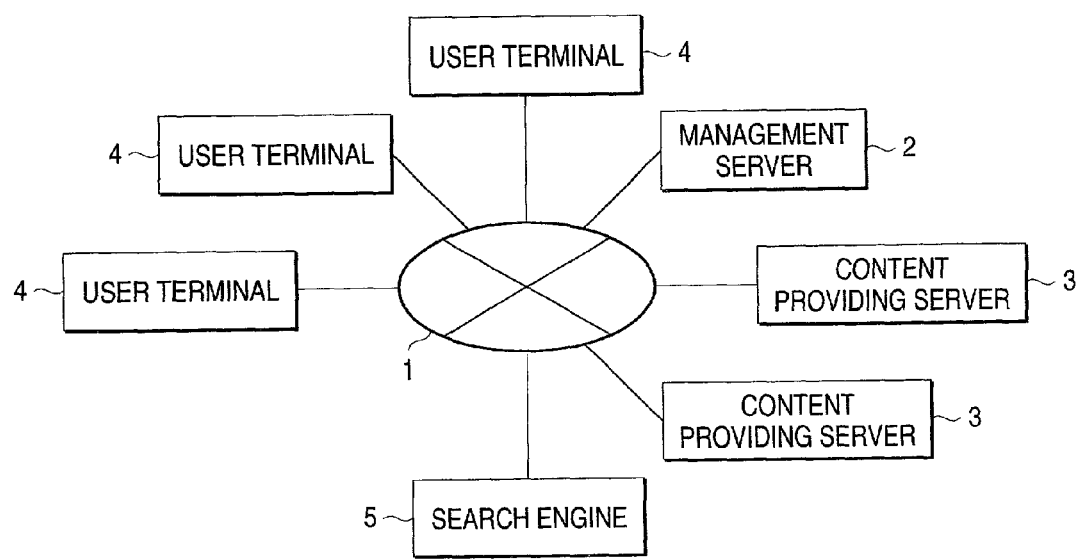
FIG. 1 is a block diagram to show the system configuration of a network game system according to the embodiment.

FIG. 1 is a block diagram to show the system configuration of the content providing system according to the embodiment. As shown in FIG. 1, the content providing system according to the embodiment comprises a management server 2 as content management means for managing the whole system, a plurality of content providing servers 3, a plurality of user terminals 4, and a search engine 5, the components 2 to 5 being connected to Internet 1 for conducting data communications with each other in accordance with TCP/IP (Transmission Control Protocol/Internet Protocol). FIG. 1 shows three user terminals 4 and two content providing servers 3, but the invention is not limited to the mentioned numbers of the components and a larger number of user terminals 4 and a larger number of content providing servers 3 may be included.

In the described configuration, the management server 2 is a server being assigned a predetermined address for providing the basic function of the content providing system according to the embodiment and managing construction of the content providing servers 3. Each user terminal 4 is provided with basic content consisting of the basic program of the content providing system according to the embodiment and necessary data by any of various means of a record medium such as a CD-ROM, distribution from the management server 2, etc. The address of the official home page of the content providing system according to the embodiment is on public view (for example, the address of the official home page is set in the basic content). The basic content of each user terminal 4, the management server 2, and the content providing servers 3 collaborate with each other for providing the function of the whole content providing system.

The content providing servers 3 are assigned independent addresses different from the address of the official home page and have each one or more content providing home pages where relevant content related to the basic content of the user terminal 4 is placed. The management server 2 installs, moves, and manages all content providing servers 3 on the Internet 1. The relevant content placed in each of the content providing servers 3 includes items and keywords related to the basic content and to be searched by the user in response to the situation, a relevant program to the basic program, or the like.

The search engine 5 is a system for searching for a page containing information matching a search condition set with a keyword, etc., across various pieces of information provided on the Internet 1. The user terminal 4 has access to the search engine 5 and can use the search engine 5 as described later to search for the relevant content.

A personal computer, etc., installing a browser for accessing the content providing server 3 and the search engine 5 through the Internet 1 for referencing various pieces of information is used as the user terminal 4. In the user terminal 4 permitted to get involved in a network game, processing using the basic content is executed by the browser, general-purpose application, etc.

Figure 2:
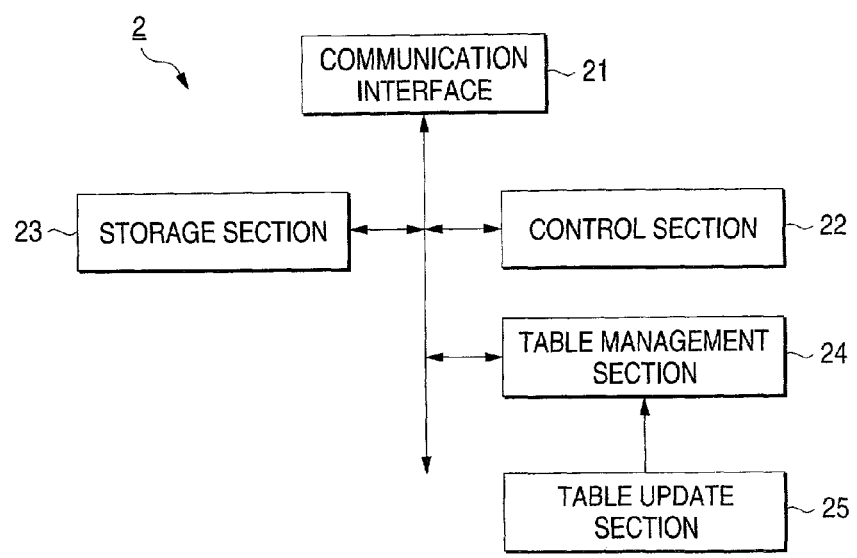
FIG. 2 is a functional block diagram to show the configuration of a management server.

Next, FIG. 2 is a functional block diagram to show the configuration of the management server 2. As shown in FIG. 2, the management server 2 comprises a communication interface 21, a control section 22, a storage section 23, a table management section 24, and a table update section 25. The communication interface 21 performs the interface operation for establishing connecting with each user terminal 4 and each content providing server 3 through the Internet 1 and conducting data communications in accordance with TCP/IP. The control section 22 consists of a CPU and memory for totally controlling the whole operation of the management server 2. The storage section 23 is implemented as memory of a hard disk, etc., storing a program executed on an official home page or a program and data required for any other processing.

The table management section 24 manages management data of relevant content provided from a content providing home page in the form of a table. The content management tables are provided in a one-to-one correspondence with types of relevant content as described later and, for example, the order of opening the content providing home pages is to be managed. When a new content providing home page is opened, the table update section 25 updates the contents of the corresponding table in the table management section 24 based on the management data. When acquiring the address of the new opened content providing home page, the administrator of the management server 2 needs to additionally register the management data in the table.

FIG. 3 shows an example of the content management table in the table management section 24. As shown in FIG. 3, a table in which management data about the relevant content specified by a provided content name (in FIG. 3, relevant content a) is described in order is formed. Of the management data contained in the table, an open schedule order indicates the order in which the content providing home pages for providing the relevant content are to be opened. When downloading of the relevant content from the content providing home page whose open order is advanced one step terminates, if the subsequent content providing home page is not opened, immediately it is opened. An HP address is an address set in the corresponding content providing home page.

Next, the management data in the table comprises a providing server name, a registration date, an open date, a download start date, a download end date, and a closed date corresponding to the relevant content with the open schedule order determined. The providing server name is the name of the content providing server 3 for providing the relevant content. The registration date is the date on which the administrator of the management server 2 registered the management data in the table. At this point in time, preparation for the content providing home page is complete. The open date is the date on which the content providing home page was opened. For the content providing home page for providing a plurality of types of relevant content, the open date is the open date when any type of relevant content is provided. The download start date is the date of starting downloading of the relevant content and the download end date is the date of ending downloading of the relevant content. In the table, the download start date of specific management data always matches the download end date of the management data preceding one entry. The closed date is the date on which the content providing home page was closed, and is a date after providing the relevant content was all terminated. If providing the relevant content is terminated, a hint of the following content providing home page maybe carried without closing that content providing home page.

Figure 4:
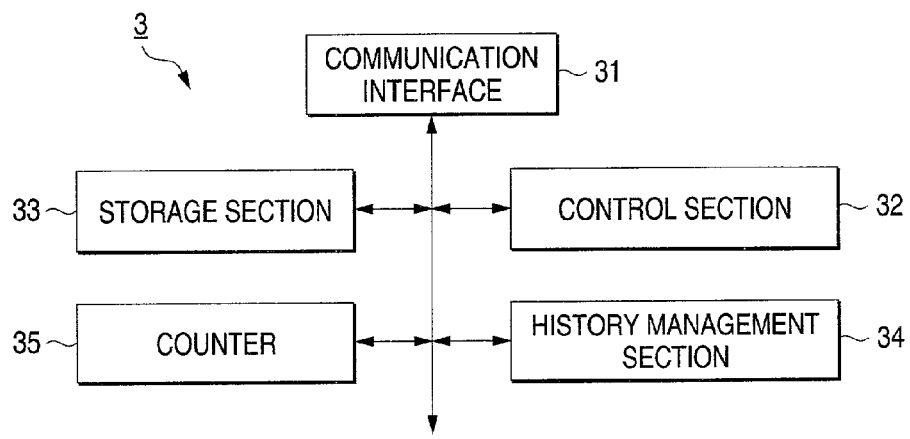
FIG. 4 is a functional block diagram to show the configuration of a content providing server.

Next, FIG. 4 is a functional block diagram to show the configuration of the content providing server 3. As shown in FIG. 4, the content providing server 3 comprises a communication interface 31, a control section 32, a storage section 33, a history management section 34, and a counter 35. The communication interface 31 performs the interface operation for establishing connecting with each user terminal 4 and each management server 2 through the Internet 1 and conducting data communications in accordance with TCP/IP. The control section 32 consists of a CPU and memory for totally controlling the whole operation of the content providing server 3. The control section 32 executes check processing of link possibility (described later) about the relevant content as required. The storage section 33 is implemented as memory of a hard disk, etc., storing a program of downloading, etc., executed on the content providing home page and the relevant content containing relevant programs downloaded, etc., in a hierarchical structure.

Figure 5:
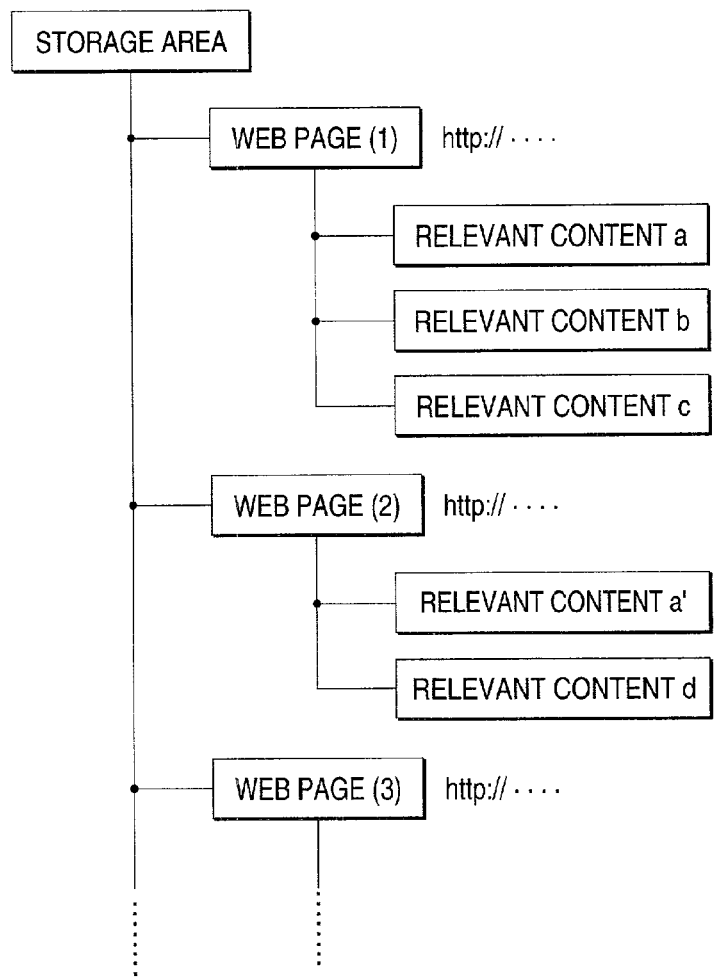
FIG. 5 is a drawing to show an example of a data structure in a storage section of the content providing server.

FIG. 5 shows an example of a data structure in the storage section 33. As shown in FIG. 5, data is recorded in a storage area of the control section 33 for each of Web pages as content providing home pages. In FIG. 5, a specific address is set in each Web page assigned a number and the Web page involves one or more types of relevant content. For example, three types of relevant content a, b, and c correspond to Web page (1) in FIG. 5 and their relevant programs, etc., are recorded in order as data. When the user accesses the content providing home page, specific relevant content is selectively sent to the user terminal 4 in response to a download request.

Referring again to FIG. 4, when the user accesses the content providing home page or makes a download request, the history management section 34 manages history information containing the IP address of the user. As the data managed in the history management section 34, the history information is managed for each content providing home page belonging to the content providing server 3 or for each type of relevant content. The counter 35 counts the number of times the relevant content has been downloaded by the users. If the content providing server 3 involves a plurality of types of relevant content, the number of times each type of relevant content has been downloaded is counted. When the count of the counter 35 reaches a predetermined value, the content providing server 3 notifies the management server 2 that acceptance of downloading the relevant content is terminated.

Next, a procedure for the user operating the user terminal 4 to use the content providing system will be discussed. First, if the basic content is provided using a record medium such as a CD-ROM, the record medium needs to be provided or if the basic content is distributed from the management server 2, it needs to be previously downloaded.

In the user terminal 4, for example, if the user gets involved in a network game, he or she starts the basic program contained in the basic content for starting the game. After this, it becomes necessary for the user to acquire relevant content of image data, items, etc., in response to the progress of the basic content. The relevant content is placed in any of content providing home pages, but the user is not informed of the address of the target content providing home page and thus the relevant content is unknown for the user at the point in time and the user needs to search for the relevant content in some way.

Then, the user accesses the search engine 5 on the Internet 1 and enters such a word becoming a hint of the relevant content for which the user should search, and the search engine 5 starts search processing. Upon completion of the search processing, the search engine 5 lists the search result and then the user selects a specific home page out of the listing. When the user accesses the selected home page, if the home page corresponds to the target content providing home page, the relevant content for which the user should search is placed. On the other hand, if the home page does not correspond to the target content providing home page, the user selects another home page and continues the above-described steps.

Acquiring the relevant content using the search engine 5 as described above is performed in various circumstances, whereby finally the purpose of the content providing system of the embodiment can be accomplished. Thus, in the content providing system according to the embodiment, the user starts with the user-acquired basic content initially and later the action range of the user is enlarged gradually on the Internet 1.

Next, processing performed in the content providing system according to the embodiment will be discussed with reference to FIG. 6, which is a flowchart to show processing executed in the accessed content providing server 3 if the user already acquiring the basic content attempts to acquire relevant content.

Figure 6:
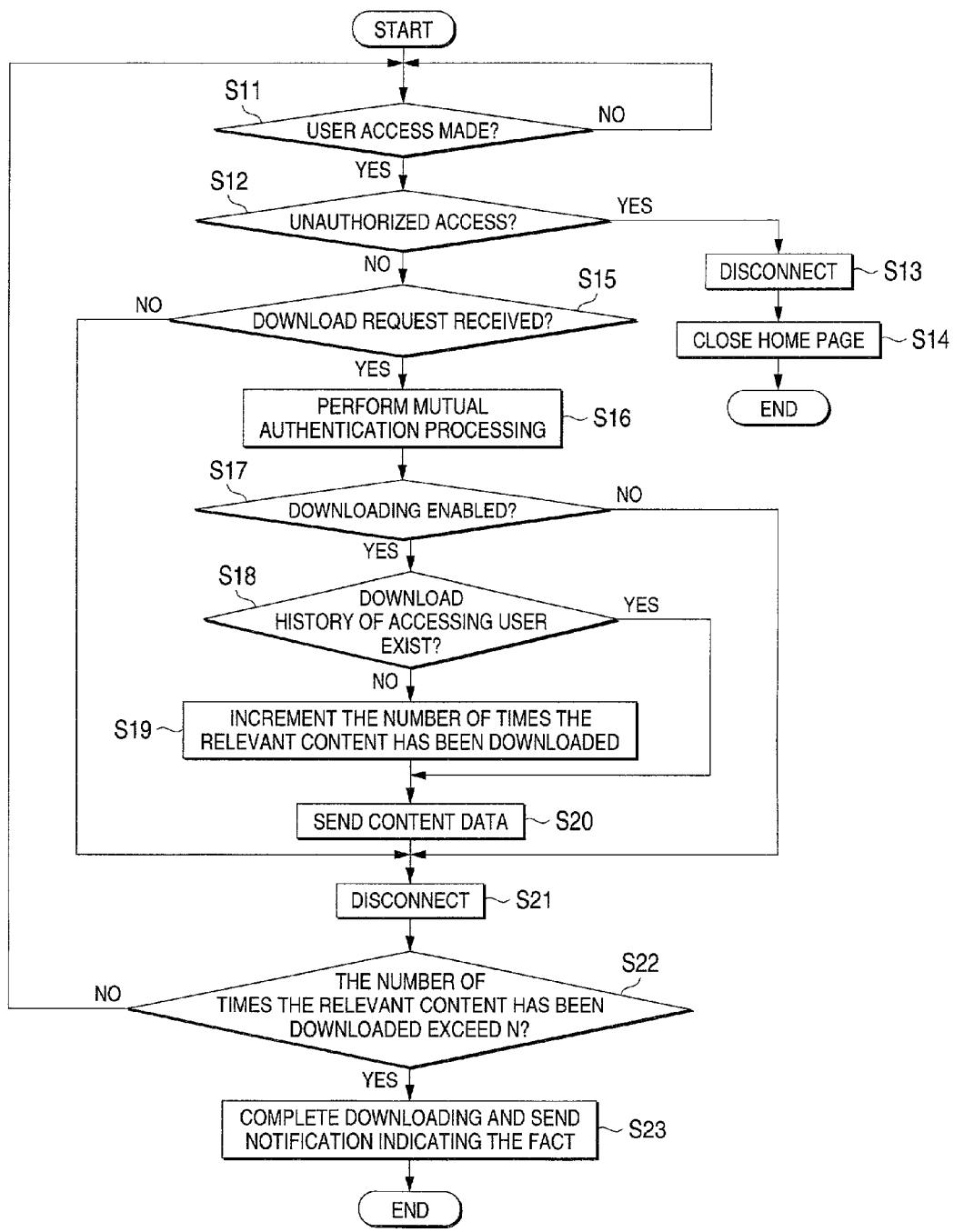
FIG. 6 is a flowchart to show processing executed in the content providing home page accessed by the user.

When the processing in FIG. 6 is started, the content providing server 3 monitors access of the user through the Internet 1 and determined whether or not access from the user terminal 4 is made (step S11). The user using the content providing system starts the browser, etc., in the user terminal 4 and accesses the home page based on the address recognized by the search result of the search engine 5, etc., as described above, whereby connection is established between the user terminal 4 and the specific content providing server 3. If user access is not made (NO at step S11), access monitoring is continued and if user access is made (YES at step S11), subsequently whether or not unauthorized access of the user is made is determined (step S12).

Step S12 is a step executed for preventing a malicious third person knowing the address of the content providing home page from accessing and assaulting the content providing home page. For example, if the content providing home page is accessed in a concentrated manner by a large number of parties at a specific timing by so-called DOS attack, access to the content providing home page from the user terminal 4 is hampered. Then, in the embodiment, a known technique of filtering each received command at the accessing time, etc., is used, for example, to determine that a command intended for unauthorized access is sent for determining whether or not unauthorized access is made.

If it is determined at step S12 that unauthorized access is made (YES at step S12), the user terminal 4 and the content providing server 3 are disconnected from each other (step S13). To exclude the later unauthorized access, the content providing server 3 closes the content providing home page accessed (step S14) and the processing in FIG. 6 is terminated. At this time, the content providing server 3 notifies the management server 2 that the content providing home page has been closed, whereby the management server 2 opens a new content providing home page to provide the relevant content provided in the closed content providing home page. Since the content providing server 3 thus closes the content providing home page, to later acquire the specific relevant content, a new address needs to be known and thus the measure is effective for preventing unauthorized access.

On the other hand, if it is determined at step S12 that valid access is made (NO at step S12), whether or not a download request is received from the user terminal 4 is determined (step S15). If a download request is received (YES at step S15), mutual authentication processing is conducted between the user terminal 4 and the content providing server 3 (step S16). On the other hand, if a download request is not received (NO at step S15), immediately control goes to step S21.

In the mutual authentication processing at step S16, the content providing server 3 sends its ID to the user terminal 4 and the user terminal 4 sends its ID to the content providing server 3 for determining whether or not the IDs are proper. At this time, the content providing server 3 may reference user information (described later) through the Internet 1 to determine whether or not the ID is proper, and the user terminal 2 may determine whether or not the ID is proper based on the basic content. Thus, the content providing server 3 checks that the user is the authorized user registered in the management server 2, and the user terminal 4 checks that the content providing server 3 corresponds to the home page provided by the management server 2 to place the relevant content.

The mutual authentication processing at step S16 assumes that the user should previously make user registration in the management server 2. The management server 2 functions as user information registration means and executes user registration processing according to a predetermined procedure at the user access time. At this time, various pieces of information such as the name and the address entered by the user are stored in the control means of the management server 2, for example, as user information and the unique ID is assigned to the user. At the time, if the user needs to be charged, simple charge processing can be performed in association with the user registration processing.

In the mutual authentication processing at step S16, the user is made to enter information that can be gotten only by the user using the program of the basic content, whereby more reliable authentication can be conducted. For example, the user may be made to enter the product number of the record medium recording the basic content, etc., or the like.

Next, if the normal authentication result is provided at step S16 and downloading is enabled (YES at step S17), the history information stored in the history management section 34 is referenced for determining whether or not a download history of the same relevant content about the accessing user exists (step S18). If the download history of the user does not exist (NO at step S18), the counter 35, namely, the number of times the relevant content has been downloaded is incremented (step S19) and control goes to step S20. On the other hand, if the download history of the user exists (YES at step S18), step S19 is skipped and control goes to step S20. Thus, if the user downloading specific relevant content in the past again downloads the same relevant content, the number of times the relevant content has been downloaded is not incremented. Therefore, closing the content providing home page as the same user has downloaded the same relevant content two or more times can be prevented.

Next, the content data corresponding to the placed relevant content is sent to the user terminal 4 (step S20). On the other hand, if downloading is not enabled based on the authentication result at step S16 (NO at step S17), steps S18 to S20 are skipped and immediately control goes to step S21.

Next, the user terminal 4 and the content providing server 3 are disconnected from each other (step S21). Subsequently, whether or not the number of times the relevant content has been downloaded exceeds a preset value N is determined (step S22). The number of times the relevant content has been downloaded is the number of times the relevant content has been downloaded since installation of specific content provider server 3 and is counted for limiting the number of times the relevant content has been downloaded. If the number of times the relevant content has been downloaded is equal to or less than N (NO at step 22), control returns to step S11 and similar processing is repeated.

On the other hand, if the number of times the relevant content has been downloaded exceeds N (YES at step S22), the later acceptance of downloading the relevant content is terminated and the content providing server 3 sends a notification indicating the fact to the management server 2 (step S23) and the processing in FIG. 6 is terminated. Upon reception of the notification, the management server 2 opens a new content providing home page to provide the same relevant content. At step S23, on the content providing home page, a hint of the following content providing home page maybe carried. Step S22 is effective, for example, for limiting the number of the users for whom the relevant content is to be provided by the content providing system to a given number. If it is not necessary to limit the number of the users for whom the relevant content is to be provided to a given number, steps S22 and S23 may be skipped.

In the example in FIG. 6, the case where the user acquires the relevant content placed on the content providing home page by downloading the relevant content has been described, but the invention is not limited to it, and the user may simply read the relevant content in the content providing server 3. For example, if the user searches for a necessary keyword, the processing concerning the downloading may be skipped.

In the example in FIG. 6, the case where the content providing server 3 is closed or moved in response to the number of times the relevant content has been downloaded or the presence or absence of unauthorized access has been described, but the content providing server 3 may be closed or moved in response to a lapse of time. That is, the relevant content in the content providing server 3 may be provided for the user only for a given time period or the address of the content providing server 3 placing specific relevant content maybe changed with the passage of time.

Next, processing performed by the management server 2 in response to the notification sent from the content providing server 3 (step S23 in FIG. 6) will be discussed with reference to a flowchart of FIG. 7.

Figure 7:
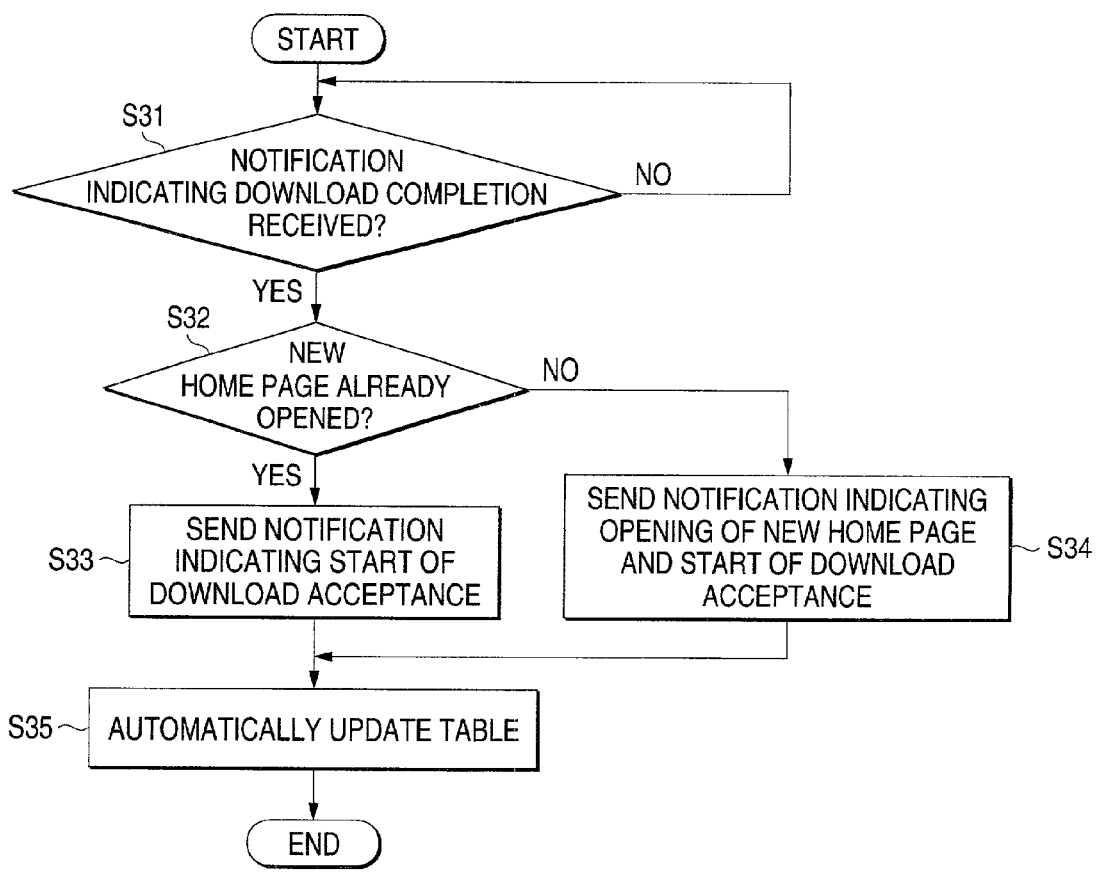
FIG. 7 is a flowchart to show processing performed by the management server in response to notification sent from the content providing server.

In FIG. 7, the management server 2 monitors notification indicating that acceptance of downloading relevant content is terminated from the content providing server 3 (step S31). If the notification is received (YES at step S31), the management server 2 determines whether or not a new content providing home page providing the same relevant content as the relevant content whose downloading is complete is already open (step S32). If the notification is not received (NO at step S31), step S31 is continued.

If it is determined at step S32 that the new content providing home page is opened by the management server 2 (YES at step S32), a notification indicating that acceptance of downloading the relevant content is started is sent to the content providing server 3 to which the content providing home page belongs (step S33). On the other hand, if the new content providing home page is not opened (NO at step S32), a notification indicating that a new content providing home page is opened and that acceptance of downloading the relevant content is started is sent to the content providing server 3 to which the content providing home page belongs (step S34).

Subsequently, the table update section 25 automatically updates the contents of the table managed by the table management section 24 (step S35) and the processing in FIG. 7 is terminated. Specifically, the management data of the open date, the download start date, etc., of the new content providing home page is registered in the table.

The content providing home page for providing specific relevant content may be changed in response to a lapse of setup time. More than one content providing home page for providing specific relevant content may be provided.

Next, application examples of the content providing system according to the embodiment will be discussed. If the user acquires various types of content for use by combining the basic content provided for the user and relevant content distributed over a plurality of content providing servers 3, as described above, the content providing system according to the embodiment can be constructed. For example, the content providing system can be constructed for a prize contest, a quiz, wallpaper collection, or a network game conducted on the Internet 1. As examples of the network games, a treasure hunt, orientating, a content growth type game such as pet breeding or robot assembling, a multistory game in which diverse stories proceed, and the like conducted on the Internet 1 can be named. Specific examples of applying the content providing system according to the embodiment to the application examples will be discussed below:

(1) Prize Contest

To apply the content providing system according to the embodiment to a prize contest, a plurality of content providing home pages intended for users entering themselves for the prize contest are opened and relevant content shouldering a role of a hint, etc., of the prize contest is placed on each of the content providing home pages. An example of applying the content providing system according to the embodiment to a prize contest will be discussed using a specific example in FIGS. 8A and 8B.

Figures 8A, 8B:
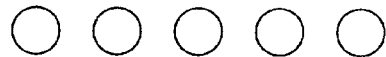
FIGS. 8A and 8B are drawings to describe a specific example of applying the content providing system according to the embodiment to a prize contest.

To begin with, it is assumed that a specific business party solicits a prize contest in the form as shown in FIG. 8A. The form as shown in FIG. 8A shoulders a role of basic content for widely opening the prize contest to the public and is disclosed through a home page on public view on the Internet 1 or media such as magazines for conveying the contents of the prize contest. The user attempting to enter himself or herself for the prize contest needs to give an answer to a predetermined keyword, etc., as shown in FIG. 8A. A hint for giving an answer is placed on the content providing home page, but the address of the page is not open to the public and the user is requested to voluntarily find out the content providing home page as described above.

On the other hand, the content providing home page shows a hint of the prize contest as relevant content in the form as shown in FIG. 8B. The user finding out and reading the content providing home page can recognize that the keyword to which an answer is to be given is "super" in FIG. 8A, for example, and can enter himself or herself for the prize contest. A plurality of keywords may be placed on a plurality of content providing home pages for more complicating the prize contest. As shown in FIG. 8B, the relevant content has a function as advertisement of the business party. Thus, if advertisement information is added to the relevant content, the user is motivated to find out the content providing home page as described above, so that the effectiveness of advertisement can be provided.

(2) Quiz

To apply the content providing system according to the embodiment to a quiz, a plurality of content providing home pages intended for users giving an answer to the quiz are opened and relevant content shouldering a role of a hint, etc., of the quiz is placed on each of the content providing home pages. It is assumed that the contents and the rule of the quiz are opened to the public as the basic content as described above. To find out the solution to the quiz, the user needs to use the search engine 5 to find out the content providing home page.

In a quiz containing a plurality of questions, an item and a keyword becoming proof of answering each question may be placed on the content providing home page for the user to acquire the proof. A plurality of users may be made to compete against one another with respect to the score based on the time taken for giving an answer to the quiz and the score (the number of answers (solutions)) In this case, it is desirable that the management server 2 should add up them as a ranking of the users based on the managed user information so that the user can reference the ranking. For example, the management server 2 may add up the scores (or times) of the users in real time and display the result as a ranking on the content providing home page. Further, the number of users getting involved in the quiz may be limited to a given number.

(3) Wallpaper Collection

To apply the content providing system according to the embodiment to wallpaper collection, a plurality of content providing home pages intended for users having a purpose of collecting any desired wallpaper are opened and relevant content corresponding to the image data of wallpaper is placed on each of the content providing home pages. It is assumed that the software for displaying the image data of wallpaper on a display is built in the user terminal 4. When the user uses the search engine 5, etc., to find out the content providing home page as described above, he or she downloads the image data of wallpaper according to the processing shown in FIG. 2.

If wallpaper is given a common feature and is serialized, the collection property can be enhanced and the user can be motivated to collect wallpaper. The number of wallpaper sheets may be limited for each type of wallpaper for providing rarity value. If a dedicated program to wallpaper collection is previously distributed to the user as the basic content and a unique function is provided, the collection property can be further enhanced. In the description, wallpaper is taken as an example, but the invention can be applied to image data of any other form in a similar manner.

Next, the following (4) to (7) are examples of network games constructed by the content providing system according to the embodiment:

(4) Treasure Hunt

To apply a network game constructed by the content providing system to a treasure hunt, a plurality of content providing home pages are opened and various items for the treasure hunt are placed on each of the content providing home pages. The user uses the search engine 5 to find out the content providing home page hiding items and keywords based on a hint obtained with the progress of the game program and collects necessary items, etc. In this case, a plurality of users can also be made to compete against one another with respect to the time required by the time a predetermined item is collected. The items and the keywords placed on each content providing home page may be changed with the passage of time.

(5) Orientating

To apply a network game constructed by the content providing system to orientating, the user references map data contained in the basic content and goes to the target point set in the game. At this time, an item and a keyword becoming proof of passing through a predetermined point on the map are placed on a content providing home page and to acquire the proof, the user finds out the content providing home page. A hint of reaching the content providing home page can be gotten, for example, on a preset official home page. The address of the content providing home page may be displayed in correlation with the position on the map, for example.

For such orientating, a plurality of users are made to compete against one another with respect to the score, for example, based on the time taken by the time the relevant content for the proof is collected. For this purpose, it is desirable that the times (scores) should be added up as a ranking so that the user can reference the ranking. For example, the management server 2 may add up the scores (or times) of the users in real time and display the result as a ranking on the official home page. In addition to the user ranking, information concerning the circumstances of the current position of each user, etc., can be displayed together. Such ranking display on the official home page can be applied not only to the orientating, but also to games in which a large number of persons compete against one another with respect to the score.

(6) Content Growth Type Game

To describe the case where a network game constructed by the content providing system is applied to a content growth type game, a robot assembling game is taken as an example. In this case, the basic content provided for the user contains configuration data of the basic character of a robot. Parts of the robot that can be added to the basic character are placed on each of a plurality of content providing home pages. The user can get a hint concerning the parts with the progress of the game program, can find out the content providing home page, can collect the parts, and can combine the parts into the basic character to gradually grow the robot.

At this time, the management server 2 manages the situation in which each user acquires the parts. Processing of making the robot of one user combat the robot of another user through the Internet 1 may be added to assembling the robot. In this case, if the management server 2 acquires the combat situation between the users, it can also add up the victories and defeats of the users for displaying a ranking. When a specific user has finally collected all parts that can be acquired, a program for generating an event involved in completion of the robot may be sent to the user.

(7) Multistory Game

The case where a network game constructed by the content providing system is applied to a multistory game will be discussed with reference to FIGS. 9 to 11. The multistory gage is a game of the type wherein the progress of a story changes in response to the action of the user in the game comprising a story property.

FIG. 9 is a drawing to describe the story progress of a multistory game constructed in the network game system. As shown in FIG. 9, the multistory game proceeds in the order of stage 1, stage 2, stage 3, stage 4, . . . A plurality of types of content corresponding to diverse story progress exist at each stage of the stage 2 and later and the link relationship between the preceding and following stages is defined in each type of content.

The first stage, the stage 1, contains content 1A corresponding to the basic content provided for the user. It is assumed that a program for the content 1A is provided for the user with a record medium such as a CD-ROM or by distributing via the Internet 1. At the stage 1, the story is common to the users and does not yet branch. As shown in FIG. 9, the content at each stage is assigned a unique content ID for management and the content 1A at the stage 1 is assigned content ID: 001.

Content 2A and content 2B are provided corresponding to the stage 2 following the stage 1 and are assigned unique content IDs. The content 2A and the content 2B are placed on predetermined content providing home pages. When the user makes a transition from stage 1 to stage 2, he or she needs to find out the content providing home page according to the above-described procedure from a hint obtained as the story proceeds. Therefore, which of the content 2A and the content 2B the user makes a transition to as the stage 2 is determined in response to the action of the user. When the content is acquired at the stage transition time, processing of checking the story for link possibility and determining whether or not the content is to be executed is performed, as described in detail later.

Likewise, content 3A, content 3B, and content 3C are provided corresponding to the stage 3 and further content 4A, content 4B, and content 4C are provided corresponding to the stage 4. Each type of content is assigned a unique content ID and is placed on a different content providing home page. Also in this case, when the user makes a transition from stage 2 to stage 3 and makes a transition from stage 3 to stage 4, he or she needs to find out the content providing home page on which the content is placed, as described above.

As shown in FIG. 9, when the transition is made from stage 2 to stage 3, the user can make the transition from the content 2A to the content 3A or the content 3B or can make the transition from the content 2B to the content 3B or the content 3C; both types of content differ in linkable content. Likewise, when the transition is made from stage 3 to stage 4, linkable content also varies from one type of content to another. This is a limitation considering the continuity, etc., of the story progress in the multistory game and the link possibility between types of content is determined in processing described later.

Next, the data structure of content acquired at the stage transition time and check processing of story link possibility relative to content in the multistory game configured as in FIG. 9 will be discussed with reference to FIGS. 10 and 11. To execute the multistory game in FIG. 9, a way of checking the story link possibility in content in the user terminal 4 after content is downloaded and a way of checking the story link possibility in content in the content providing server 3 before content is downloaded are available and each type of content has data structures corresponding to the two ways.

To begin with, checking the story link possibility after content contained in the multistory game is downloaded will be discussed. FIG. 10 is a drawing to show the data structure of the content 1A at the stage 1 and the data structure of each type of content at each of the stage 2 and the later stages in contrast with each other as content provided corresponding to each stage. As shown in the upper portion of FIG. 10, the content data corresponding to the content 1A comprises a game ID, a content ID, a game basic program, a content program, and a check program.

The game ID is a unique ID assigned to the network game and the same game ID is assigned to all types of content making up one network game. On the other hand, the content ID is a unique ID assigned to the content 1A at the stage 1 for distinguishing the content 1A from other types of content. The game basic program is a program corresponding to the basic function common to the whole multistory game, and the content program is a program corresponding to the story portion of the content 1A at the stage 1. The check program is a program for determining the link possibility from stage 1 to stage 2 by checking downloaded content at the transition time from stage 1 to stage 2.

On the other hand, as shown in the lower portion of FIG. 10, the content data corresponding to the content at each of stage 2 and the later stages comprises a game ID, a content ID, a content program, and a check program. As compared with the data structure of the content 1A shown in the upper portion of FIG. 10, the game basic program is not contained, but the content program corresponding to the story portion of each type of content is contained and further the game ID and the check program have the functions as described above.

Before check processing of the story link possibility, the content providing home page found out by the user executing the multistory game with the user terminal 4 is accessed and then content is downloaded in accordance with the processing shown in FIG. 6. Next, the check program of the content corresponding to the current stage is executed in the user terminal 4 for determining the link possibility of the downloaded content. In this case, the content ID of the downloaded content is referenced and whether or not the content ID matches that of preset linkable content is determined, whereby the link possibility can be determined.

Taking the configuration shown in FIG. 9 as an example, when the content 2A at the current stage 2 is being executed, it is determined that the current content can be linked only to the content 3A or 3B at the stage 3 and cannot be linked to any other content. If it is determined that the current content cannot be linked to even the content once downloaded by the user, the game will not proceed with the content. In this case, it becomes necessary for the user to find out by search, etc., the content providing home page on which the valid content is placed in response to the story.

Next, checking the story link possibility before content contained in the multistory game is downloaded will be discussed. FIG. 11 is a drawing to show the data structure of the content 1A at the stage 1 and the data structure of each type of content at each of the stage 2 and the later stages in contrast with each other. The data structures in FIG. 11 differ from those in FIG. 10 in that the check program is not contained in any type of content; link possibility check processing is not performed in the user terminal 4. Other points in the content data structures in FIG. 11 are similar to those in FIG. 10 and therefore will not be discussed again.

When the content providing home page on which content for the multistory game configured as in FIG. 11 is placed is accessed by the user, if a content download request is received from the user, the game progress state of the user at the point in time is checked. In the content providing server 3 or the management server 2, a predetermined check program is executed for determining the link possibility of the content requested to be downloaded. With the user terminal 4, only the content determined to be linkable can be downloaded and the content determined to be unlinkable cannot be downloaded, then the user will find out a new content providing home page.

If the management server 2 manages the user information, the story progress of the multistory game may be changed for each user. For example, different types of content are provided in response to the age and the gender of the user and the link relationship between the different types of content may be changed whenever necessary.

Next, time management during gage progress for a plurality of users to play a multistory game will be discussed. The multistory game according to the embodiment includes first time management in which proper type is set in the game of each user and second time management in which common time to the users is set. According to the first time management, the time responsive to the game progress flows starting at the point in time when each user starts a game and the time in the game of one user differs from that of another user. On the other hand, according to the second time management, if the game start point in time of one user differs from that of another user, the game of each user proceeds following the common time axis.

In the second time management, if an event based on the action of a specific user occurs at one point in time, the event has an effect on other users. For example, if a specific user acquires a unique item, then it becomes impossible for other users to acquire the item. Both the first time management and the second time management may be used to set common item for a specific event and set proper time in the game of each user for any other than the specific event.

The specific examples for applying the content providing system of the embodiment have been described, but the embodiment is not limited to the described specific examples and can be widely applied to any content providing system on the network 1 which has the system configuration in FIG. 1 and can perform the above-described processing.

As described above, according to the invention, to execute a game consisting of the basic content and the relevant content, the network (Internet) itself that can be accessed by every user is used as the environment for executing the game, whereby an unprecedented game rich in idea can be provided.

What is claimed is:

1. A network game system for operating on a network a game made up of basic content containing a basic program for executing start of a game solely and one or more types of relevant content each containing a relevant program corresponding to the basic program for further advancing the game started by the basic program, said system comprising:

a content management section adapted to set a content providing home page address of which users are not notified in one or more content providing servers each in which the relevant program is placed; and a search engine for finding a target content providing home page adapted to receive over the network, hint keywords, input by a user, from a user terminal and for using the received keywords as the search condition to perform a search processing to create a list of relevant content providing home page addresses and sending the list to the user terminal;

wherein the content providing server comprises a counter for counting the number of times the relevant content has been provided to the users from the content providing home page;

the content providing server sends the relevant content placed in the content providing server to the user terminal in response to a download request made by the accessing user; and the content providing server limits the number of users for which the relevant content is to be provided from the content providing home page by terminating providing the relevant content when a count of the counter reaches a predetermined value.

2. The network game system as claimed in claim 1 wherein the relevant content has a check program for previously checking link possibility with the basic content or any other type of relevant content.

3. The network game system as claimed in claim 1 wherein upon reception of the download request made by the accessing user, the content providing server checks a holding state of relevant content in the user terminal and checks link possibility between the relevant content held in the user terminal and the relevant content requested to be downloaded.

4. The network game system as claimed in claim 1 wherein each of the content providing servers has one or more content providing home pages capable of providing one or more types of relevant content for the accessing user and the content management section sets the address of which the users are not notified in the one or more content providing home pages.

5. The network game system as claimed in claim 4 wherein the content management section changes the address of the content providing home page with a lapse of time.

6. The network game system as claimed in claim 4 wherein the content providing server determines unauthorized access to the content providing home page and if unauthorized access is made, changes the address of the content providing home page.

7. The network game system as claimed in claim 4 wherein the content management means has a management server for managing the download enable state of the relevant content from the content providing home page and when terminating downloading the relevant content from the content providing home page belonging to the content providing server, the content providing server notifies the management server of the fact.

8. The network game system as claimed in claim 1 wherein the content management means comprises user information registration means for registering user information and enables the relevant content to be provided only for the registered users.

9. The network game system as claimed in claim 8 wherein to provide the relevant content for the user terminal, the content providing server performs mutual authentication processing with the user based on the user information and provides the relevant content for the user terminal after authenticating identification of the user.

10. A network game providing method for providing for users over a network a game made up of basic content provided for each user and containing a basic program for executing start of a game solely and one or more types of relevant content each containing a relevant program corresponding to the basic program for further advancing the game started by the basic program. said network game providing method comprising the steps of:

setting a content providing home page address of which the users are not notified in one or more content providing servers each in which the relevant program is placed, the address for which a search is made by search means on the network from a user terminal;

searching for a target content providing home page by receiving hint keywords, input by a user and received from a user terminal as the search condition to perform a search processing and creating and sending a list of relevant content providing home page addresses to the user terminal;

when the user accessing the content providing server makes a download request, sending the relevant content placed in the content providing server to the user terminal;

wherein the number of users for which the relevant content is to be provided from the content providing home page is limited by terminating providing the relevant content when the number of users reaches a predetermined value.

11. The network game providing method as claimed in claim 10 wherein the relevant content has a check program for previously checking link possibility with the basic content or any other type of relevant content.

12. The network game providing method as claimed in claim 10 wherein when the user accessing the content providing server makes the download request, a holding state of relevant content in the user terminal is checked and link possibility between the relevant content held in the user terminal and the relevant content requested to be downloaded is checked.

13. The network game providing method as claimed in claim 10 wherein each of the content providing servers has one or more content providing home pages capable of providing one or more types of relevant content for the accessing user and the address of which the users are not notified is set in the one or more content providing home pages.

14. The network game providing method as claimed in claim 13 wherein the address of the content providing home page is changed with a lapse of time.

15. The network game providing method as claimed in claim 13 wherein unauthorized access to the content providing home page is determined and if unauthorized access is made, the address of the content providing home page is changed.

* * * * *